United States Patent [19]
Komoda

[11] Patent Number: 4,557,892
[45] Date of Patent: Dec. 10, 1985

[54] NUCLEAR FUEL ELEMENT

[75] Inventor: Sei-ichi Komoda, Hitachi, Japan

[73] Assignee: Hitachi, Ltd., Tokyo, Japan

[21] Appl. No.: 467,801

[22] Filed: Feb. 18, 1983

[30] Foreign Application Priority Data

Feb. 19, 1982 [JP] Japan ................... 57-24490

[51] Int. Cl.[4] .................... G21C 3/18; G21C 3/32
[52] U.S. Cl. .................. 376/412; 376/420;
376/436; 376/443; 376/409
[58] Field of Search ............. 376/409, 412, 420, 436,
376/413, 454, 443

[56] References Cited

U.S. PATENT DOCUMENTS

| | | | |
|---|---|---|---|
| 3,030,291 | 4/1962 | Butler et al. | 376/454 |
| 3,211,627 | 10/1965 | Thorp, II | 376/420 |
| 3,573,168 | 3/1971 | Campbell | 376/436 |
| 3,629,066 | 12/1971 | Andersson et al. | 376/436 |
| 3,702,282 | 11/1972 | Gatley et al. | 376/420 |
| 3,713,975 | 1/1973 | Katell | 376/412 |
| 3,801,449 | 4/1974 | Cayol et al. | 376/436 |
| 4,147,591 | 4/1979 | Miki | 376/454 |

Primary Examiner—Harvey E. Behrend
Attorney, Agent, or Firm—Antonelli, Terry & Wands

[57] ABSTRACT

A nuclear fuel element suitable for use in fast breeder. The fuel element has a clad tube and a wire spacer wound round the clad tube. The clad tube of the fuel element is composed of a first clad tube and a second clad tube which are connected to each other through an intermediate plug. The first clad tube extends upwardly from the intermediate plug. The upper end of the first clad tube is closed by an upper end plug, while the lower end of the second clad tube is closed by a lower end plug. The first clad tube is charged with a multiplicity of fuel pellets, while the second clad tube defines a gas plenum therein. The spaces inside the first and second clad tubes are communicated with each other through vent holes formed in the intermediate plug. The wire spacer is wound round the first clad tube and is fixed at its one end to the end plug attached to the first clad tube and at its other end to the intermediate plug.

7 Claims, 7 Drawing Figures

NUCLEAR FUEL ELEMENT

BACKGROUND OF THE INVENTION

The present invention relates to a nuclear fuel element and, more particularly, to a nuclear fuel element suitable for use in a fast breeder.

Generally, a fast breeder has a core loaded with fuel assemblies each having a wrapper tube of a hexagonal cross-section and a multiplicity of fuel pins which are the nuclear fuel elements. The fuel pin has a clad tube closed at its both ends by end plugs, a multiplicity of fuel pellets charged in the clad tube and a wire spacer spirally wound round the clad tube. The wire spacer is fixed at its both ends to the end plugs closing the ends of the clad tube. A gas plenum is formed within the clad tube at a lower portion of the fuel pin. An intermediate plug is disposed at the boundary between the gas plenum and the region charged with pellets. The intermediate plug is a porous member which is attached to the clad tube. The core of the fast breeder is loaded with core fuel assemblies and blanket fuel assemblies. The pellets charged in the core fuel assemblies contain $PuO_2$ while the pellets charged in the blanket fuel assemblies do not contain $PuO_2$ but are composed of natural uranium or depleted uranium. Both of the core fuel assemblies and the blanket fuel assemblies have the construction explained hereinabove.

Liquid sodium as a coolant is circulated through the wrapper tube of each fuel assembly in the reactor core. The liquid sodium, however, encounters a large resistance and, hence, a large pressure drop is caused because wire spacers are wound round numerous fuel pins.

SUMMARY OF THE INVENTION

Accordingly, an object of the invention is to provide a fuel element improved to reduce the pressure drop of the coolant circulated through the fuel assembly.

Another object of the invention is to provide a fuel pin having a reduced axial length.

To these ends, according to one aspect of the invention, there is provided a fuel pin in which a wire spacer wound round a clad tube is fixed at its one end to an intermediate plug provided on the clad tube and at its other end to an end plug attached to one axial end of the clad tube.

According to another aspect of the invention, there is provided a fuel pin in which the outside diameter of the portion of the clad tube surrounding the heat generating section extending from the intermediate plug towards one axial end of the clad tube is selected to be smaller than the outside diameter of the portion of the clad tube surrounding the gas plenum which extends from the intermediate plug towards the other axial end of the clad tube.

These and other objects, features and advantages of the invention will become clear from the following description of the preferred embodiments taken in conjunction with the accompanying drawings.

DESCRIPTION OF THE PREFERRED EMBODIMENTS

Figure 2:
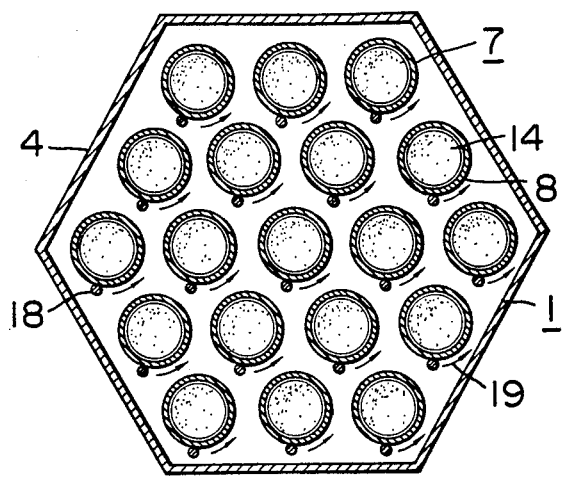
FIG. 2 is a sectional view taken along the line II—II of FIG. 1.
Figure 1:
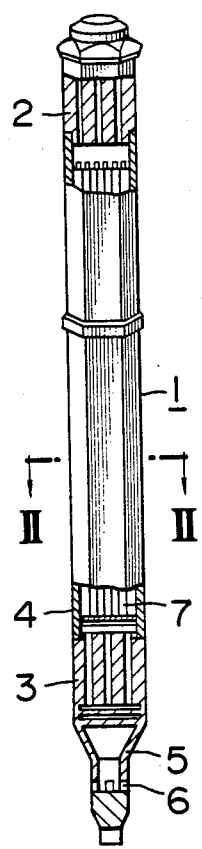
FIG. 1 is an illustration of the construction of a fuel assembly used in a fast breeder.

The construction of a fuel assembly for fast breeders, incorporating fuel pins in accordance with an embodiment of the invention, will be described hereinunder with reference to FIGS. 1 and 2.

The fuel assembly 1 includes an upper tie plate 2, lower tie plate 3, a wrapper tube 4 through which the upper and lower tie plates 2 and 3 are connected to each other, and a multiplicity of fuel pins 7 disposed in the wrapper tube 4. The lower tie plate 3 is provide at its lower portion with an entrance nozzle 5 having a sodium inlet 6. As shown in FIG. 2, the wrapper tube 4 is a tubular structure having a hexagonal cross-sectional shape. The distance between the inner surface of the opposing walls of the wrapper tube 4 is 132.1 mm.

A plurality of fuel assemblies 1 are mounted in the reactor core of a nuclear reactor vessel (not shown) of a fast breeder. Sodium as a coolant is charged in the nuclear reactor vessel. The sodium flows into each fuel assembly 1 through the sodium inlet 6 in the entrance nozzle 5 and flows upwardly in the wrapper tube 4 through the gaps defined between adjacent fuel pins 7. More specifically, the upward flow of the sodium is guided to flow spirally by the wire spacer 18 wound round the fuel pin 7 as indicated by arrows 19 in FIG. 2.

A fuel pin 7 in accordance with a preferred embodiment of the invention will be described hereinunder with specific reference to FIGS. 3 and 4. The fuel pin 7 has a first clad tube 8 closed at its upper end by an upper end plug 10 and a second clad tube 9 which is closed at its lower end by a lower end plug 13. These end plugs 10 and 13 are fixed by welding to respective ends of the clad tubes 8 and 9. The first clad tube 8 and the second clad tube 9 are welded at their lower end and upper end, respectively, to an intermediate plug 11 having a multiplicity of vent holes 12 so that the first and second clad tubes 8 and 9 are united with each other through the intermediate plug 11. The first clad tube 8 has a greater axial length than the second clad tube 9. Both clad tubes 8 and 9 have an outside diameter of 7.4 mm and a wall thickness of 0.4 mm. The first clad tube 8 extending upwardly from the intermediate plug 11 is charged with a large number of fuel pellets 14 which are urged downwardly by the force of a coiled spring 15 through the medium of a heat insulating plate 16. A gas plenum is formed in the second clad tube 9 extending downwardly from the intermediate plug 11. The gas plenum 17 has an axial length of 1000 mm and a volume of 34.2 $cm^3$. The fission product gas generated through fission during the operation of the fast breeder is moved through the vent holes 12 into the gas plenum 17 and is stored in the latter. Thus, the gas plenum effectively suppresses the pressure rise in the fuel pin 7 attributable to the accumulation of the fission product gas during the operation of the fast breeder.

A wire spacer 18 having an outside diameter of 1.35 mm is wound round the first clad tube 8, and is fixed by welding at its ends to the upper end plug 10 and the intermediate plug 11 as at X and Y. The wire spacer 18 is arranged at the heat generating side, i.e. around the region charged with the fuel pellets, of the fuel pin 7. In the illustrated embodiment, the heat generating section of the fuel pin 7 extends upwardly from the intermediate plug 11, and the portion of the fuel pin 7 below the intermediate plug has only the gas plenum 17 and does not make any contribution to the heat generation. The wire spacer 18 is wound by 7 (seven) turns around the first clad tube 8. The length of the fuel pin 7 is 3000 mm. The wire spacer 18 wound round the heat generating section of each fuel pin effectively prevents the heat generating sections of adjacent fuel pins from contacting with each other. Two hundred and seventeen (217) fuel pins of the construction described above are arranged in the wrapper tube 4 in the form of lattice of regular triangles as shown in FIG. 2. The pitch of the fuel pins 7, i.e. the distance between adjacent fuel pins 7 is 8.8 mm. Although in FIG. 2 a gap is formed between the wire spacer 18 wound round a fuel pin 7 and an adjacent fuel pin 7, the wire spacer 18 actually contacts also the adjacent fuel pin 7. Namely, the gap between adjacent fuel pins 7 is preserved by the wire spacer 18, and the minimum gap is equal to the outside diameter of the wire spacer 18. In the described embodiment of the invention, the wire spacer winds round only the heat generating section of the fuel pin 7 but does not extend downwardly beyond the intermediate plug 11. In other words, according to the invention, it is possible to reduce the length of the portion of the fuel pin 7 round which the wire spacer 18 is wound. Accordingly, the pressure drop of the coolant in the fuel assembly 1 accommodating the fuel pins 7 of the described embodiment can be decreased remarkably as compared with the conventional fuel assembly as will be explained later in connection with Table 1. Furthermore, the time length required for winding the wire spacer is shortened because the length for the wire spacer 18 is decreased and, therefore, the time length required for the fabrication of the fuel pin 7 is shortened advantageously.

Figure 5:
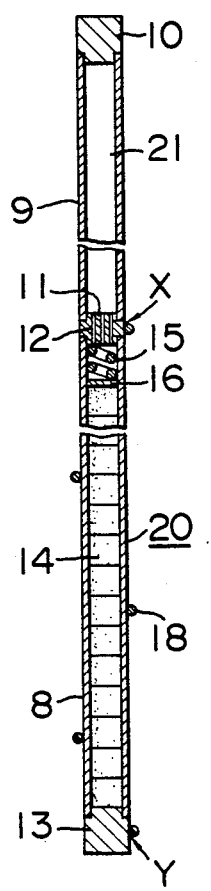
FIGS. 5 and 6 are vertical sectional views of fuel pins in accordance with different embodiments of the invention.

FIG. 5 shows a fuel pin in accordance with another embodiment of the invention. This embodiment is discriminated from the embodiment explained before in that the gas plenum is formed in the upper portion of the fuel pin. To explain in more detail with reference to FIG. 5, a fuel pin 20 has a first clad tube 8 welded at its upper end to the intermediate plug 11 having vent holes 12 and a second clad tube 9 welded at its lower end to the intermediate plug 11. The lower end of the first clad tube 8 and the upper end of the second clad tube 9 are closed, respectively, by a lower end plug 13 and an upper end plug 10 welded thereto. Fuel pellets 14 are charged in the first clad tube 8 extending downwardly from the intermediate plug 11. Thus, in this fuel pin 20, the portion below the intermediate plug 11 constitutes the heat generating section. The fuel pellets 14 in the first clad tube 8 are depressed by a coiled spring 15 through a heat insulating plate 16. The other end of the coiled spring 15 contacts the intermediate plug 11. The gas plenum 21 is provided in the portion of the fuel pin 20 above the intermediate plug 11, i.e. in the second clad tube 9. The wire spacer 18 is wound by 7 (seven) turns round the first clad tube 8 below the intermediate plug 11 and constituting the heat generating section. The wire spacer 18 is fixed at its ends by welding to the intermediate plug 11 and the lower end plug 13 as at X and Y. In contrast to the fuel assembly having the fuel pins 7 shown in FIG. 3 in which the gas plenum 17 is formed in the lower portion of the fuel pin 7, the fuel assembly constituted by the fuel pins 20 of this embodiment has gas plenums 21 formed in the upper end portion. The temperature of the sodium supplied to the fuel assembly is 385° C., while the temperature of the heated sodium coming out of the fuel assembly is 530° C. Thus, the gas plenum 21 in the fuel pin 20 of this embodiment is subjected to a temperature higher than the gas plenum 17 in the fuel pin 7 shown in FIG. 3. Therefore, the gas plenum 21 of the described embodiment has a length of 1220 mm which is greater than the length of the gas plenum 17 of the fuel pin 7 shown in FIG. 3. The greater length of the gas plenum 21 is necessary for absorbing the greater thermal expansion of the gas in the gas plenum 21 which is subjected to higher temperature than the gas plenum 17 of the fuel pin 7 shown in FIG. 3. The pressure drop of the coolant in the fuel assembly incorporating the fuel pins 20 of this embodiment is increased by an amount corresponding to the increment of length of the gas plenum as compared with the pressure drop caused in the fuel assembly incorporating the fuel pins 7 shown in FIG. 3, but is still smaller than the pressure drop caused in the fuel assembly incorporating conventional fuel pins having gas plenums in the lower end portion and having the wire spacer wound round over the entire length thereof. More practically, the pressure drop of the coolant in the fuel assembly having the fuel pins 20 of this embodiment is 3.32 Kg/cm$^2$ while the pressure drop in the fuel assembly having the conventional fuel pins is 3.49 Kg/cm$^2$.

Figure 6:
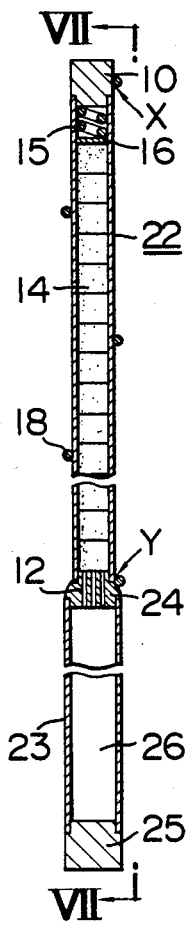
Figure 7:
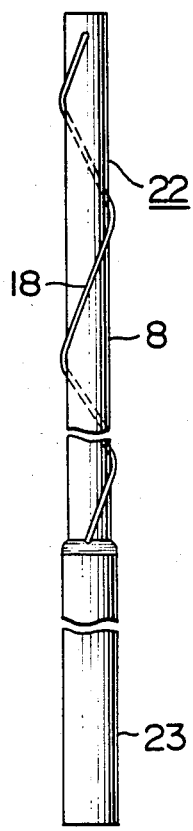
FIG. 7 is a side elevational view of the fuel pin as viewed in the direction of the arrows VII—VII of FIG. 6.

FIGS. 6 and 7 show still another embodiment in which the second clad tube 9 of the fuel pin 7 has an increased outside diameter.

The fuel pin 22 of this embodiment has a first clad tube 8, upper end plug 10, fuel pellets 14, wire spacer 18, second clad tube 23, intermediate end plug 24 and a lower end plug 25. Both of the first and second clad tubes 8 and 23 have a wall thickness of 0.4 mm, but the second clad tube has an inside diameter and an outside diameter greater than that of the first clad tube 8. More specifically, the first clad tube 8 has an outside diameter of 7.4 mm, while the second clad tube 23 has an outside diameter of 7.6 mm. The lower end of the first clad tube 8 and the upper end of the second clad tube 23 are fixed by welding to the intermediate plug 24. The intermediate plug 24 is provided with vent holes 12. The upper end of the first clad tube 8 and the lower end of the second clad tube 23 are closed, respectively, by the upper end plug 10 and the lower end plug 25 welded thereto. The fuel pellets 14 are charged in the first clad tube 8 above the intermediate plug 24 so that the heat generating section is constituted by the portion of the fuel pin 22 above the intermediate plug 24. A gas plenum 26 is formed in the second clad tube 23 below the intermediate plug 24. The volume of the gas plenum 26 in this embodiment may be as small as 34.2 cm$^3$, i.e. equal to that of the gas plenum 17 of the fuel pin 7 shown in FIG. 3, because the gas plenum 26 is disposed at the lower portion of the fuel assembly where the sodium temperature is low. The axial length of the gas plenum 26 may be reduced to 942 mm much smaller than 1000 mm which is the length of the gas plenum 17 because the outside diameter of the second clad tube 23 is greater than that of the second clad tube 9 in the preceding embodiments. In consequence, the axial length of the fuel pin 22 as a whole is decreased to 2942 mm sufficiently smaller than 3000 mm which is the overall length of the fuel pin 7. According to this embodiment, therefore, it is possible to decrease the axial length of the fuel assembly. The wire spacer 18 of 1.35 mm dia. is wound round the first clad tube 8 by 7 (seven) turns. The wire spacer 18 is fixed at its both ends by welding to the upper end plug 10 and the intermediate plug 24 at X and Y shown in FIG. 6. As will be seen from Table 1 presented later, the pressure drop of the coolant in the fuel assembly incorporating the fuel pin 22 of this embodiment is greater than that in the fuel assembly incorporating the fuel pin shown in FIG. 3 but is still smaller than that in the fuel assembly having the conventional fuel pins and can satisfy both of the demands for reduced pressure drop and reduced axial length of the fuel pin simultaneously.

The pressure drop ΔP of the liquid sodium along the length of the fuel assembly through which the sodium flows will be evaluated in accordance with the Blasius's formula hereinunder. The pressure drop ΔP is given by the following formula.

$$\Delta P = \lambda \frac{\Delta L}{De} \frac{\rho}{2g} V^2 \quad (1)$$

where
ΔL: axial length of flow channel
De: hydro-equivalent diameter of flow channel
ρ: density of coolant
g: gravitational acceleration (980.7 cm/sec$^2$)
v: mean flow velocity
λ: $0.3164/Re^{0.25}$
Re: DeV/ν
De: 4A/S
ν: kinematic coefficient of viscosity
A: area of flow channel
S: length of wetted perimeter Table 1 shows the process and result of the calculation of the pressure drop ΔP in the fuel pin bundle of the fuel assembly. The flow rate of coolant was assumed to be 32.34 Kg/sec and the physical values of sodium exhibited at 500° C., i.e. the density ρ of 0.8323 g/cm$^2$ and kinematic coefficient of viscosity ν of $2.841 \times 10^{-3}$ cm$^2$/sec were used. The thermal expansions of the wrapper tube, fuel pins and wire spacers were neglected.

drop of 0.12 Kg/cm$^2$ is realized by the fuel assembly incorporating the fuel pins 22 of the invention shown in FIG. 6, as compared with the fuel assembly incorporating the conventional fuel pins. The pressure drop in the fuel assembly incorporating the fuel pin 20 shown in FIG. 5 was obtained by the same procedure as that for obtaining the data shown in Table 1.

It is to be noted here that the evaluation of the pressure drop made hereinabove takes into account only the friction loss. Actually, however, the pressure drop is caused not only by the friction but also by expansion or contaction of the flow caused by the spacer wire. Therefore, when the latter two factors are taken into account, the amount of reduction in pressure drop in each embodiment becomes greater than the respective values mentioned above.

In the fuel pin 22 of the embodiment shown in FIG. 6, the axial length of the gas plenum 26 can be reduced by increasing the outside diameter of the second clad tube 23. An excessive increase in the outside diameter of the second clad tube 23, however, may cause an effect to undesirably increase the pressure drop by an amount which is greater than the decrease in the pressure drop afforded by the reduction in the axial length of the gas plenum. In consequence, the influence of the increased outside diameter becomes more dominant than the influence of the reduced axial length of gas plenum to cause an apparent increase in the pressure drop. In order to obviate this problem, in the fuel pin 22 shown in FIG. 6, it is necessary to select the outside diameter of the second clad tube 23 to be less than 1.038 times as large as the outside diameter of the first clad tube 8. More specifically, in the fuel pin 22 shown in FIG. 6, the axial length of the gas plenum 26 is 920 mm when the outside diameter of the second clad tube 23 is about 7.681 mm while the outside diameter of the first clad tube 8 is 7.4 mm. The pressure drop in the fuel assembly incorporating this fuel pin, however, is substantially equal to that exhibited by the fuel assembly incorporating the conventional fuel pins.

It is also possible to make the outside diameter of the second clad tube 9 of the fuel pin 20 shown in FIG. 5 larger than that of the first clad tube 8, as in the case of the second clad tube 23 of the fuel pin 22 shown in FIG. 6.

The fuel pins of the embodiments explained hereinbefore are mounted in the core of the reactor of a fast

TABLE 1

Figure 3:
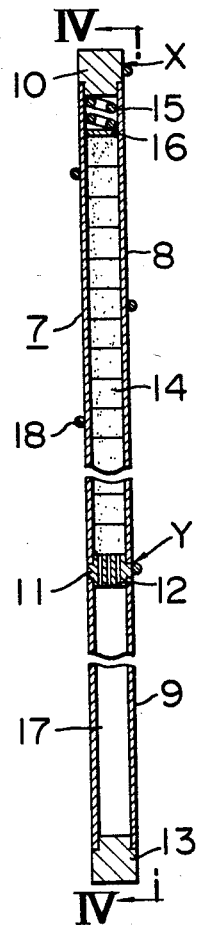
FIG. 3 is a vertical sectional view of a fuel pin constructed in accordance with a preferred embodiment of the invention.
Figure 4:
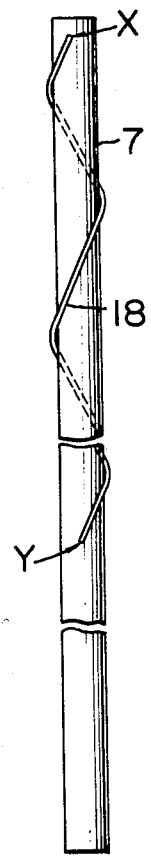
FIG. 4 is a side elevational view of the fuel pin as viewed in the direction of the arrows IV—IV of FIG. 3.

| | Pressure drop ΔP in fuel pin bundle | | |
|---|---|---|---|
| | fuel assembly incorporating conventional fuel pins | fuel assembly incorporating fuel pins shown in FIG. 3 | fuel assembly incorporating fuel pins shown in FIG. 6 |
| Pressure drop ΔP$_1$ over fuel pin portion having wire spacer | A = 54.69 cm$^2$<br>De = 0.3406 cm<br>v = 710.5 cm/sec<br>ΔL = 300 cm<br>ΔP$_1$ = 3.49 kg/cm$^2$ | A = 54.64 cm$^2$<br>De = 0.3406 cm<br>v = 710.5 cm/sec<br>ΔL = 200 cm<br>ΔP$_1$ = 2.33 kg/cm$^2$ | A = 54.69 cm$^2$<br>De = 0.3406 cm<br>v = 710.5 cm/sec<br>ΔL = 200 cm<br>ΔP$_1$ = 2.33 kg/cm$^2$ |
| Pressure drop ΔP$_1$ over fuel pin portion with no wire spacer | | A = 57.80 cm$^2$<br>De = 0.4202 cm<br>v = 672.3 cm/sec<br>ΔL = 100 cm<br>ΔP$_2$ = 0.81 kg/cm$^2$ | A = 52.68 cm$^2$<br>De = 0.3737 cm<br>v = 737.6 cm/sec<br>ΔL = 94.2 cm<br>ΔP$_2$ = 1.04 kg/cm$^2$ |
| Pressure drop (ΔP$_1$ + ΔP$_2$) | ΔP = 3.49 kg/cm$^2$ | ΔP = 3.14 kg/cm$^2$ | ΔP = 3.37 kg/cm$^2$ |

From Table 1, it will be seen that the fuel assembly incorporating the fuel pins of the embodiment shown in FIG. 3 shows a pressure drop which is smaller than that in the fuel assembly incorporating the conventional fuel pins by 0.35 Kg/cm$^2$. Similarly, a decrease in pressure breeder. To explain the construction of the fuel pin shown in FIG. 3 by way of example, the heat generating section in the first clad tube 8 above the intermediate plug 11 of the fuel pin is sectioned into three regions: namely, an uppermost first region charged with blanket fuel pellets which contain natural uranium but no plutonium, a second region charged with core fuel pellets containing plutonium, and a third region charged with the blanket fuel pellets. In this type of fuel pin, it is possible to dispose an intermediate plug similar to the intermediate plug 11 used in the described embodiments, between the first region and the second region and between the second region and the third region. These intermediate plugs are attached to the first clad tube 8. In such a case, it is possible to arrange such that the wire spacer 18 is fixed at its both ends to two intermediate plugs disposed at both sides of the second region so that the wire spacer 18 surrounds only the second region of the first clad tube 8. The first and the third regions are the blanket regions in which the heat generation rate is much smaller than that in the second region containing plutonium. According to this arrangement, the wire spacer is provided only around the second region which is the region of the highest temperature, so that the pressure drop of the coolant is decreased remarkably.

As will be fully understood from the foregoing description, according to the invention, it is possible to obtain a fuel pin which can advantageously reduce the pressure drop of the coolant flowing through the fuel assembly incorporating the fuel pins.

Although the invention has been described through specific terms, it is to be noted here that the described embodiments are only illustrative and various changes and modifications may be imparted thereto without departing from the scope of the invention which is limited solely by the appended claims.

I claim:

1. A nuclear fuel assembly having a tubular body accommodating a multiplicity of nuclear fuel elements, each nuclear fuel element comprising a clad tube including a first clad tube portion and a second clad tube portion, an intermediate plug to which an end of each of said first and second clad tube portions is attached, said intermediate plug having passage means therethrough for enabling fluid communication between said first and second clad tube portions, end plugs respectively attached to the other ends of said first and second clad tube portions, a plurality of fuel pellets being charged in said first clad tube portion, a gas plenum formed in said second clad tube portion, and a wire spacer wound round only said first clad tube portion charged with said fuel pellets, said wire spacer having opposite ends thereof respectively fixed to said intermediate plug and said end plug attached to the other end of said first clad tube portion, said second clad tube portion having an inside diameter greater than the inside diameter of said first clad tube portion.

2. A nuclear fuel assembly to claim 1, wherein said first clad tube portion and said second clad tube portion have the same wall thickness.

3. A nuclear fuel assembly according to claim 1, wherein said second clad tube portion forming said gas plenum has an outside diameter which is less than 1.038 times as large as the outside diameter of said first clad tube portion surrounded by said wire spacer.

4. A nuclear fuel assembly according to claim 1 or 3, wherein said tubular body accommodating said multiplicity of nuclear fuel elements delimits a path for flow of coolant therethrough from an inlet end to an outlet end, said fuel elements being disposed in said tubular body so that the gas plenum formed in said second clad portion is disposed proximate to one of the inlet end and outlet end of said tubular body.

5. A nuclear fuel assembly according to claim 4, wherein said second clad tube portion is disposed proximate to the inlet end of said tubular body.

6. A nuclear fuel assembly according to claim 4, wherein said second clad tube portion is disposed proximate to the outlet end of said tubular body.

7. A nuclear fuel assembly according to claim 1, wherein said second clad tube portion is disposed below said first clad tube portion, and said second clad tube portion has an outside diameter greater than that of said first clad tube portion.

* * * * *